US012647470B2

(12) United States Patent (10) Patent No.: US 12,647,470 B2
Agrawal et al. (45) Date of Patent: Jun. 2, 2026

(54) MANAGING PRIVACY IN A VIDEO COMMUNICATION SESSION

(71) Applicant: MOTOROLA MOBILITY LLC, Wilmington, DE (US)

(72) Inventors: Amit Kumar Agrawal, Bangalore (IN); Krishnan Raghavan, Bangalore (IN); Hariprasad Shanbhogue Alampady, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 241 days.

(21) Appl. No.: 18/473,913

(22) Filed: Sep. 25, 2023

(65) Prior Publication Data

US 2025/0106267 A1 Mar. 27, 2025

(51) Int. Cl.
| | |
|---|---|
| *H04L 65/403* | (2022.01) |
| *H04L 65/1089* | (2022.01) |
| *H04L 65/402* | (2022.01) |
| *H04L 65/613* | (2022.01) |
| *H04N 7/14* | (2006.01) |
| *H04N 7/15* | (2006.01) |

(52) U.S. Cl.
CPC ........ *H04L 65/403* (2013.01); *H04L 65/1089* (2013.01); *H04L 65/402* (2022.05); *H04L 65/613* (2022.05); *H04N 7/141* (2013.01);

*H04N 7/142* (2013.01); *H04N 7/147* (2013.01); *H04N 7/15* (2013.01)

(58) Field of Classification Search
None
See application file for complete search history.

(56) References Cited

U.S. PATENT DOCUMENTS

| | | | | |
|---|---|---|---|---|
| 9,854,206 | B1 * | 12/2017 | Ren | H04N 7/147 |
| 11,516,431 | B2 * | 11/2022 | Rey | H04N 7/147 |
| 2022/0353467 | A1 * | 11/2022 | Truong | H04W 12/02 |
| 2024/0054786 | A1 * | 2/2024 | Andresen | H04N 5/2628 |

* cited by examiner

*Primary Examiner* — Quoc D Tran
(74) *Attorney, Agent, or Firm* — Isidore PLLC

(57) ABSTRACT

A communication device, computer program product, and method are provided that generate an image stream to be transmitted from one communication device to at least another communication device in a video communication session. A controller (i) identifies, within a first image stream, secondary content displayed within at least one surface included in a first field of view, and (ii) in response to identifying the secondary content displayed within the at least one surface (a) generates a second image stream that does not include at least a portion of the secondary content; and (b) transmits the second image stream in place of the first image stream to the at least one second communication device during the video communication session.

20 Claims, 13 Drawing Sheets

700

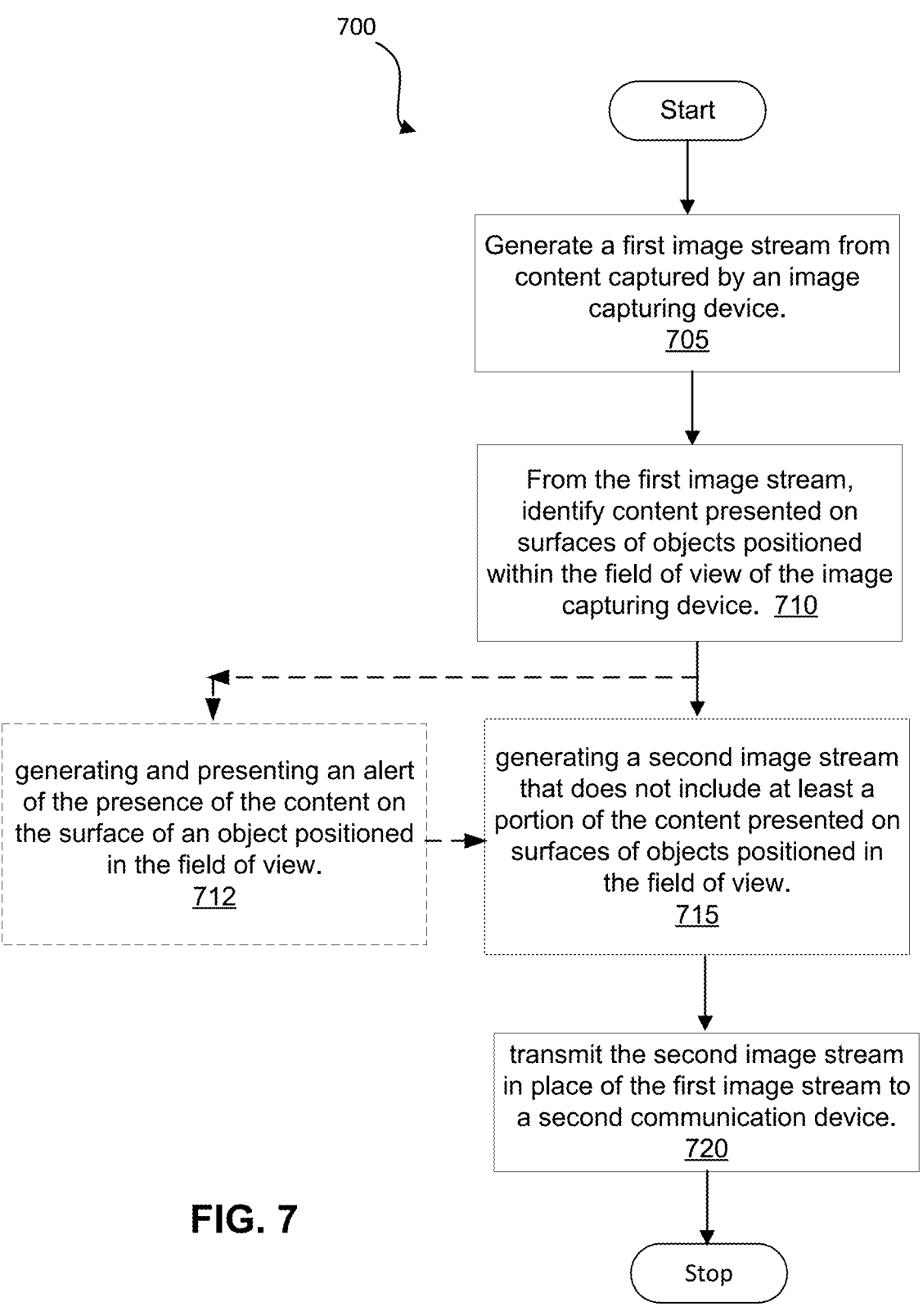

Start

Generate a first image stream from content captured by an image capturing device.
705

From the first image stream, identify content presented on surfaces of objects positioned within the field of view of the image capturing device. 710 generating and presenting an alert of the presence of the content on the surface of an object positioned in the field of view.
712 generating a second image stream that does not include at least a portion of the content presented on surfaces of objects positioned in the field of view.
715 transmit the second image stream in place of the first image stream to a second communication device.
720

Stop

FIG. 7

MANAGING PRIVACY IN A VIDEO COMMUNICATION SESSION

BACKGROUND

1. Technical Field

The present disclosure relates generally to communication devices that support and/or enable video communication sessions with second communication device(s), and more particularly to communication devices that transmit locally captured video content during a video communication session.

2. Description of the Related Art

Communication devices such as mobile phones, network servers, desktop workstations, laptops, and tablets are often used to participate in or to enable online human communication. So as to simulate an in-person conversation, meeting, or lecture, each participant in a video communication session generally positions themself in front of an image capturing device within the field of view of the image capturing device. In addition to the field of view incorporating a participant, the field of view may incorporate other objects that are proximately close to the participant. Image streams may be generated based on images captured within the field of view. The image streams may be communicated to the video communication session for presentation to other participants in the video communication session. In normal operations, a participant may not be concerned with the content of the image streams being presented to the other participants in the video communication session. However, in some situations, the participant may prefer certain information to be excluded from the content of the image streams.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIGS. 7-9 depict flow diagrams of three different methods for preventing displaying of secondary content that are presented on visible surfaces included within an image stream being captured for transmission via a video communication session to second participant devices, according to one or more embodiments.

DETAILED DESCRIPTION

Figure 1A:
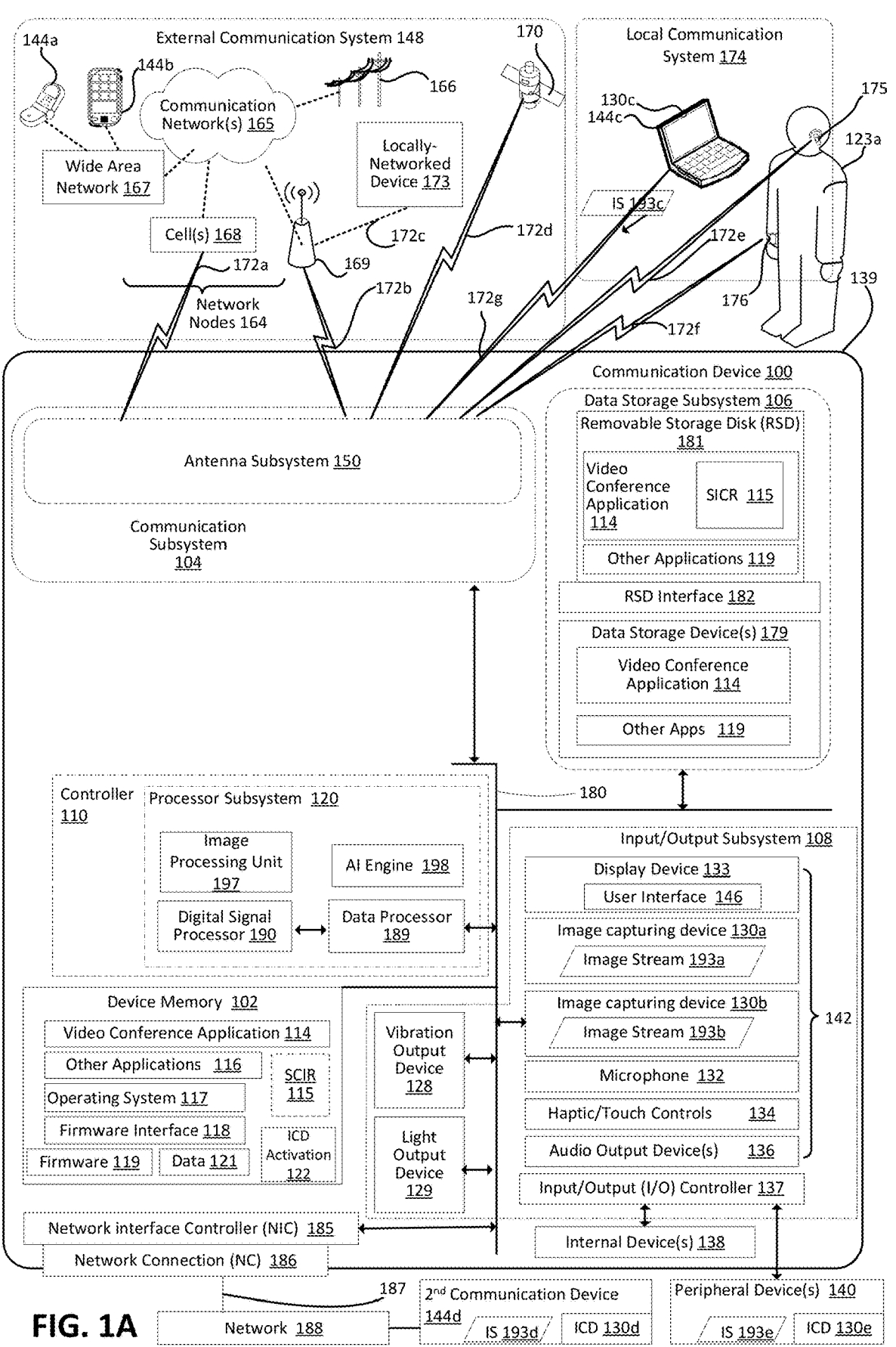
FIG. 1A depicts a functional block diagram of a communication environment including a communication device configured to facilitate a video communication session, and within which certain of the features of the present disclosure can be advantageously implemented, according to one or more embodiments.

The present disclosure provides a communication device, a method, and a computer program product that prevents displaying of secondary content presented on surrounding surfaces within an image stream being captured at the communication device for sharing via a video communication session. In one or more embodiments, the communication device includes a first display device and at least one image capturing device, including a first image capturing device having a first field of view that incorporates a space in front of the first image capturing device. The first image capturing device produces a first image stream encompassing content within the first field of view. The communication device also includes: at least one network interface, including a first network interface that communicatively connects the communication device via a first network to at least one second communication device during a video communication session; and a controller communicatively coupled to the first display device, the first image capturing device, and the first network interface. The controller: (i) identifies, within the first image stream, secondary content displayed within at least one surface included in the first field of view; and (ii) in response to identifying the secondary content displayed within the at least one surface (a) generates a second image stream that does not include at least a portion of the secondary content; and (b) transmits the second image stream in place of the first image stream to the at least one second communication device during the video communication session.

In one or more embodiments, the method provides computer-implemented processes for generating and autonomously modifying image streams in a video communication session. The method includes capturing, by a first image capturing device, a first image stream encompassing content within a first field of view, the first image capturing device associated with a first communication device participating in a video communication session via a first network. The method includes identifying, within the first image stream, secondary content displayed within at least one surface included in the first field of view. The method includes, in response to identifying the secondary content displayed within the at least one surface: generating a second image stream that does not include at least a portion of the secondary content; and transmitting the second image stream in place of the first image stream to the at least one second communication device during the video communication session.

In one or more embodiments, the disclosure may include a computer program product that includes a computer readable storage device; and program code on the computer readable storage device that when executed by a processor associated with a communication device, the program code enables the communication device to provide functionality of the above described method processes.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical, and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

FIG. 1A depicts a functional block diagram of a communication environment including a communication device 100 configured to facilitate a video communication session, and within which certain of the features of the present disclosure are advantageously implemented, according to one or more embodiments. Referring now to the specific component makeup and the associated functionality of communication device 100. In one or more embodiments, communication device 100 has device memory 102, communication subsystem 104, data storage subsystem 106, and input/output (I/O) subsystem 108. Device memory 102 and each subsystem (104, 106, and 108) are managed by controller 110. Device memory 102 includes program code for applications, such as video conference application 114, and other application(s) 116. Video conference application 114 includes (or is enhanced with) secondary image content removal (SICR) module 115, which implements various aspects of the disclosure. Device memory 102 further includes operating system (OS) 117, firmware interface 118, such as basic input/output system (BIOS) or Uniform Extensible Firmware Interface (UEFI), and firmware 119.

Controller 110 includes processor subsystem 120 that executes program code to provide operating functionality of communication device 100, including the specific functionality described herein. The software and/or firmware modules have varying functionality when their corresponding program code is executed by processor subsystem 120 or secondary processing devices within communication device 100. Processor subsystem 120 of controller 110 can execute program code of video conference application 114 (e.g., to facilitate a video communication session) and other application(s) 116 to configure communication device 100 to perform specific functions. In particular, processor subsystem 120 can execute code of image capturing device (ICD) activation module 122 of video conference application 114 that triggers a local image capturing device to capture content within a field of view of the local image capturing device, which content may include an image of a local participant in the video communication session together with images of other objects or screens within a proximate area of the participant, and processor subsystem 120 can execute the specific code of secondary content removal (SICR) module 115 that causes the processor subsystem 120 to identify and remove, replace, or obscure secondary content captured on the surfaces of the other objects and screens before transmitting an image stream to a video conferencing session. Device memory 102 can include data 121 generated and/or used by the video conference application 114, SICR module 115, and/or other application(s) 116.

I/O subsystem 108 includes user interface components such as vibration output device 128, light output device 129, image capturing devices 130a-130b, microphone 132, display device 133, touch/haptic controls 134, and audio output device(s) 136. In an example, image capturing devices 130a-130b are front and back cameras. In another example, image capturing devices 130a-130b are on the same side but have different lenses, such as two different ones of telephoto, wide angle, macro, or general-purpose lenses. I/O subsystem 108 also includes I/O controller 137. I/O controller 137 connects to internal devices 138, which are internal to housing 139, and to peripheral devices 140, such as external speakers, which are external to housing 139 of communication device 100. Internal devices 138 include computing, storage, communication, or sensing components depicted within housing 139. I/O controller 137 supports the necessary configuration of connectors, electrical power, communication protocols, and data buffering to act as an interface between internal devices 138 and peripheral devices 140 and other components of communication device 100 that use a different configuration for inputs and outputs.

Communication device 100 is managed by controller 110, which is communicatively coupled to image capturing devices 130a-130b and to at least one user interface device 142, such as at least one microphone 132. Image capturing device 130a and user interface device 142 allows a participant using communication device 100 to be an active participant in a video communication session with a second participant using a corresponding one of second communication device(s) 144a-144d that can be similarly configured and/or provide similar functionality as communication device 100. Controller 110 is also communicatively coupled to at least one display device 133 that presents user interface 146 for the video communication session. Controller 110 executes video conference application 114 stored in device memory 102 to configure communication device 100 to enable communication with second communication device(s) 144a-144d in the video communication session. It is appreciated that second communication device(s) 144a-144d can be identically or similarly equipped with components and functionality described for communication device 100.

Each of communication device 100 and second communication device(s) 144a-144d can be one of a host of different types of electronic devices, including but not limited to, a mobile cellular phone, satellite phone, or smart-phone, a laptop, a net-book, an ultra-book, a networked smart watch or networked sports/exercise watch, and/or a tablet computing device or similar device that can include wireless and/or wired communication functionality. As an electronic device supporting wireless communication, communication device 100 can be utilized as, and also be referred to as, a system, device, subscriber unit, subscriber station, mobile station (MS), mobile, mobile device, remote station, remote terminal, user terminal, terminal, user agent, user device, a Session Initiation Protocol (SIP) phone, a wireless local loop (WLL) station, a personal digital assistant (PDA), computer workstation, a handheld device having wireless connection capability, a computing device, or other processing devices connected to a wireless modem. Within the description of the remaining figures, references to similar components presented in a previous figure are provided the same reference numbers across the different figures. Where the named component is presented with different features or functionality, a different reference numeral or a subscripted reference numeral is provided (e.g., 100a in place of 100).

Referring now to the communication components and features of communication device 100. Communication subsystem 104 of communication device 100 enables wireless communication with external communication system 148. Communication subsystem 104 includes antenna subsystem 150 having one or more antennas. Communication subsystem 104 may also include one or more transmitters to deliver information through an antenna and one or more receivers to receive information from the antenna.

In one or more embodiments, controller 110, via communication subsystem 104, performs multiple types of over-the-air (OTA) communication with network nodes 164 of external communication system 148. Particular network nodes 164 can be part of communication networks 165 of public land mobile networks (PLMNs) that provide connections to plain old telephone systems (POTS) 166 for voice calls and wide area networks (WANs) 167 for data sessions. WANs 167 can include Internet and other data networks available to communication device 100 and second communication device(s) 144a/144b.

In one or more embodiments, network nodes 164 can be access node(s) 169 that support wireless OTA communication. Communication subsystem 104 can receive OTA communication from location services such as provided by global positioning system (GPS) satellites 170. Communication subsystem 104 receives downlink broadcast channel(s) 172d from GPS satellites 170 to obtain geospatial location information. Communication subsystem 104 communicates via OTA communication channel(s) 172a with base stations 168. Communication subsystem 104 communicates via wireless communication channel(s) 172b with access node(s) 169. In one or more particular embodiments, access node(s) 169 supports communication using one or more IEEE 802.11 wireless local area network (WLAN) protocols. Wi-Fi™ is a family of wireless network protocols, based on the IEEE 802.11 family of standards, which are commonly used between user devices and network devices that provide Internet access. In one or more particular embodiments, communication subsystem 104 communicates with one or more locally networked devices 173 via wired or wireless link 172c provided by access node(s) 169.

In one or more embodiments, controller 110, via communication subsystem 104, performs multiple types of OTA communication with local communication system 174. In one or more embodiments, local communication system 174 includes wireless headset 175 and smart watch 176 that are coupled to communication device 100 to form a personal access network (PAN). Communication subsystem 104 communicates via low power wireless communication channel(s) 172e with wireless headset 175. Communication subsystem 104 communicates via second low power wireless communication channel(s) 172f, such as Bluetooth, with smart watch 176, which can be used by local participant 123a. In one or more particular embodiments, communication subsystem 104 communicates with second communication device(s) 144c via wireless link 172g to form an ad hoc network.

Data storage subsystem 106 of communication device 100 includes data storage device(s) 179. Controller 110 is communicatively connected, via system interlink 180, to data storage device(s) 179. Data storage subsystem 106 provides applications, program code, and stored data on nonvolatile storage that is accessible by controller 110. For example, data storage subsystem 106 can provide a selection of applications and computer data such as video conference application 114 and other application(s) 116 that use communication services. These applications can be loaded into device memory 102 for execution by controller 110. In one or more embodiments, data storage device(s) 179 can include hard disk drives (HDDs), optical disk drives, and/or solid-state drives (SSDs), etc. Data storage subsystem 106 of communication device 100 can include removable storage device(s) (RSD(s)) 181, which is received in RSD interface 182. Controller 110 is communicatively connected to RSD 181, via system interlink 180 and RSD interface 182. In one or more embodiments, RSD 181 is a non-transitory computer program product or computer readable storage device. Controller 110 can access RSD 181 or data storage device(s) 179 to provision communication device 100 with program code, such as code for video conference application 114 and other application(s) 116.

In one or more embodiments, I/O subsystem 108 includes network interface controller (NIC) 185 with a network connection (NC) 186 at a perimeter of housing 139. In one embodiment, NC 186 can be an Ethernet connection. Network cable 187 connects NC 186 to network 188. NIC 185 can be referred to as a "network interface" that can support one or more network communication protocols. Network 188 can be a local area network (LAN), a campus area network (CAN), a metropolitan area network (MAN), or a wide area network (WAN). Second communication devices 144d is shown communicatively coupled to network 188.

Controller 110 manages, and in some instances directly controls, the various functions and/or operations of communication device 100. These functions and/or operations include, but are not limited to including, application data processing, communication with second communication devices, navigation tasks, image processing, and signal processing. In one or more alternate embodiments, communication device 100 may use hardware component equivalents for application data processing and signal processing. For example, communication device 100 may use special purpose hardware, dedicated processors, general purpose computers, microprocessor-based computers, micro-controllers, optical computers, analog computers, dedicated processors and/or dedicated hard-wired logic.

Controller 110 includes processor subsystem 120, which includes one or more central processing units (CPUs), depicted as data processor 189. Processor subsystem 120 can include one or more digital signal processors (DSP) 190 that are integrated with data processor 189. Processor subsystem 120 can include other processors that are communicatively coupled to data processor 189, such as baseband processor (not shown). In one or embodiments that are not depicted, controller 110 can further include distributed processing and control components that are external to housing 139 or grouped with other components, such as I/O subsystem 108. Data processor 189 is communicatively coupled, via system interlink 180, to device memory 102. In one or more embodiments, controller 110 of communication device 100 is communicatively coupled via system interlink 180 to communication subsystem 104, data storage subsystem 106, and I/O subsystem 108. Processor subsystem 120 can include artificial intelligence (AI) engine 198 that can be trained to perform different processes related to identifying secondary content in an image stream and replacing or removing at least portions of the identified secondary content with a different content. Processor subsystem 120 can also include an image processing unit (IPU) 197 which can be used by the AI engine 198 to identify secondary content captured by an image capturing device in an image stream and to obscure the secondary content or replace or remove areas of the image stream having the secondary content with a different content. System interlink 180 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (system interlink 180) are illustrated in FIG. 1, it is to be understood that more, fewer, or different interconnections may be present in other embodiments.

In one aspect, communication device 100 can provide the functionality of both the image capturing device and the image stream transmitting device. In one or more embodiments, at least one external image capturing device is communicatively connected to communication device 100 and to provides the first image stream from corresponding external image capturing device and that is evaluated and modified by controller 110. In an example, peripheral device 140 has image capturing device 130e that provides image stream 193e to controller 110. Controller 110 configures communication device 100 to perform the functionality described herein for identifying certain content that may be inadvertently included within a captured image stream (193a, 193b) and for generating and transmitting a modified image stream without at least a portion of the identified content to other participants in a video communication session. In an example, controller 110 executes secondary content identification and removal (SCIR) module 115, which can be a component of video conference application 114 stored in a computer readable medium such as device memory 102, to automatically identify certain content in an image stream generated from contents captured by one image capturing device (from a plurality of device-supported image capturing devices 130a-130e, which can each provide a respective image stream 193a-193) and remove or obscure such content from the transmitted image stream.

Figure 1B:
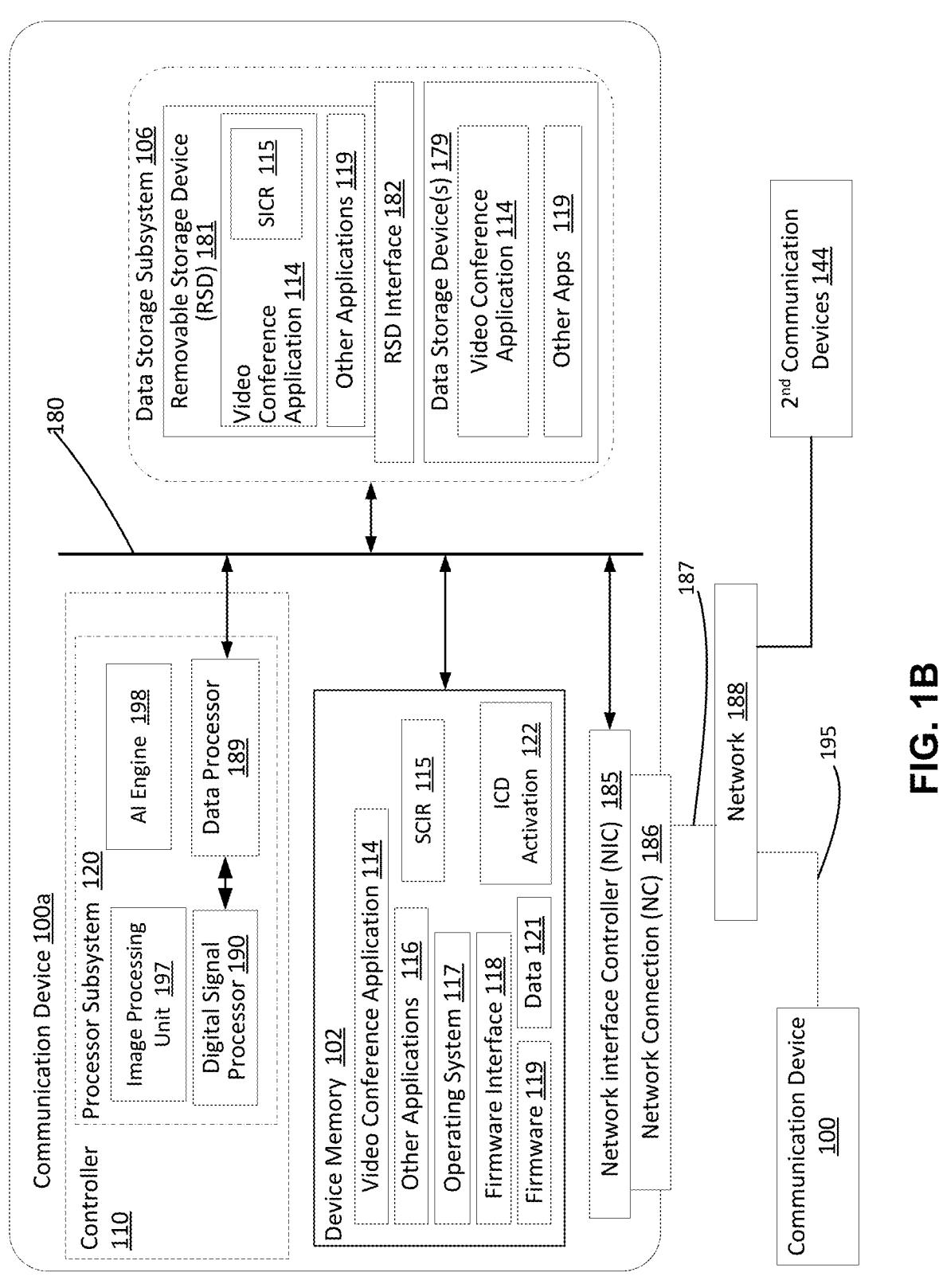
FIG. 1B depicts a functional block diagram of a second embodiment of a communication device configured as a network server and which identify visual content in an image stream generated from contents captured by one image capturing device during a video communication session, and within which the features of the present disclosure are advantageously implemented, according to one or more embodiments.

FIG. 1B depicts a functional block diagram of a second embodiment of a communication device 100a configured as a network server and which identify visual content in an image stream generated from contents captured by one image capturing device during a video communication session, and within which the features of the present disclosure are advantageously implemented.

In one or more embodiments, communication device 100a can have similar or identical components to communication device 100, with certain components modified, added, or not included, as needed, for communication device 100a to function as a network server. In one or more embodiment, communication device 100a is configured as a network server having controller 110 that manages device memory 102, data storage subsystem 106, and NIC 185. Communication device 100a is communicatively connected with communication device 100 via network 188. Connection 195 from the communication device 100 to the network 188 can be a wired connection or a wireless connection. Controller 110 executes video conference application 114 to configure communication device 100a to facilitate one or more communication sessions for communicatively-connected second communication devices 144.

Figure 2:
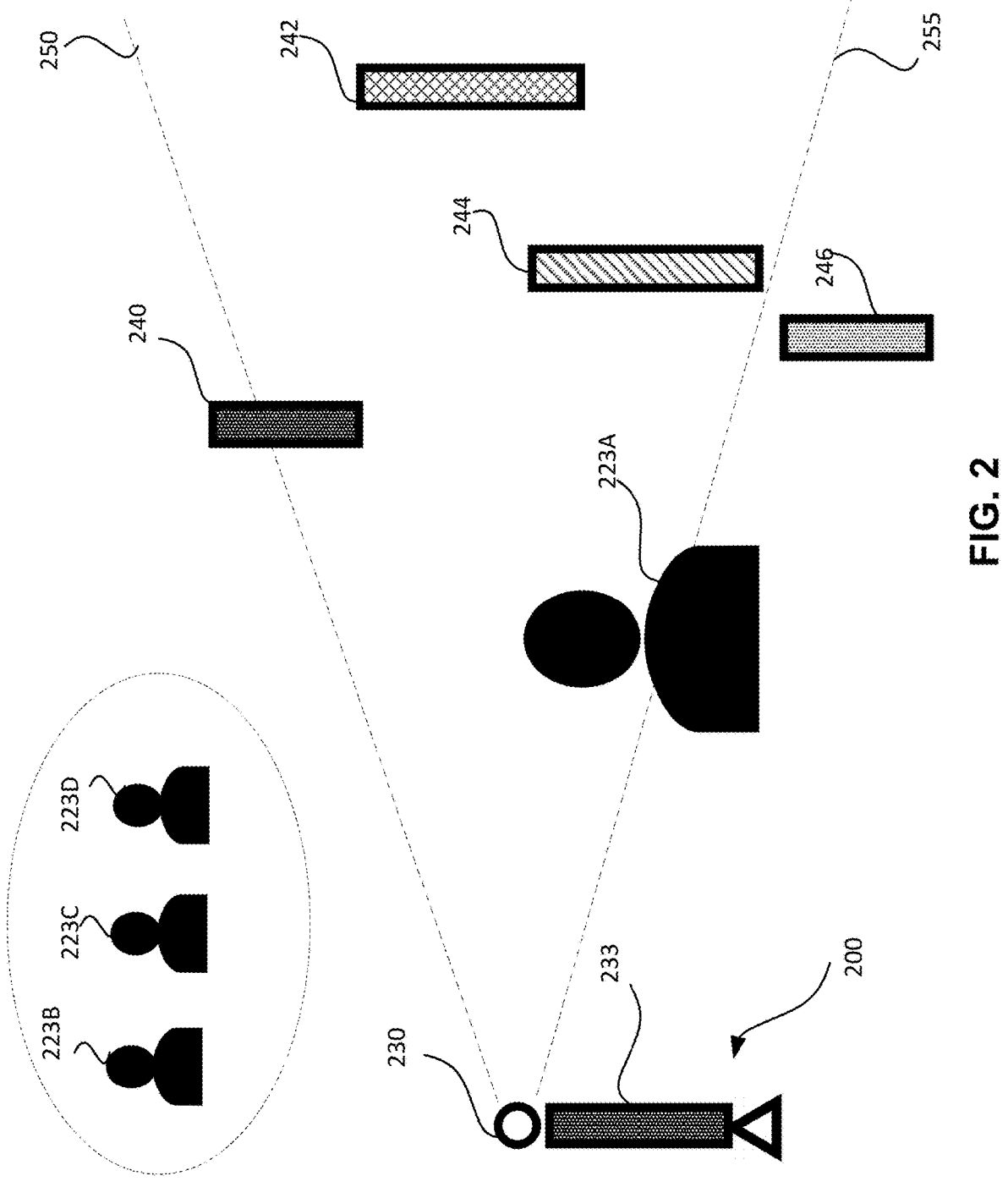
FIG. 2 depicts a side view of an example environment in which a first participant is located while participating in a video communication session using a communication device, according to one or more embodiments.

FIG. 2 depicts a side view of an example environment in which a first participant is located while participating in a video communication session using a communication device 200, according to one or more embodiments. Communication device 200 may include display device 233 and image capturing device 230. While shown as a separate component, image capturing device 230 can be embedded or integrated within the communication device 200, e.g., within the top frame segment or under the display device 233, in one or more alternate embodiments. Also, in yet another embodiment, image capturing device 230 can be located within a second electronic device (such as communication device 100) that is communicatively coupled to the display device 233. Participant 223A may participate in a video communication session with other participants 223B-223D while positioned within a space in front of the image capturing device 230, so as to be visible within the field of view. The participant 223 may also be positioned in front of the display device 233. The image capturing device 230 may be configured to capture images and videos that include content within a field of view, indicated by the dashed lines extending from image capturing device 230. For example, the field of view is depicted in FIG. 2 as a two-dimensional space defined by an upper boundary 250 and a lower boundary 255. It is appreciated that the actual field of view is a 3-dimensional space and is in part dependent on which image capturing device is being utilized to capture the video that is to be transmitted as an image stream to the video communication session.

As illustrated, objects having visible surfaces are positioned within a proximity of participant 223A and may be within the field of view of the image capturing device 230. For example, at least some parts of the objects 240, 242 and 244 are positioned within the field of view of the image capturing device 230, while object 246 is positioned entirely outside of the field of view of the image capturing device 230. Some of these objects may be electronic objects (e.g., a television) and some may be non-electronic objects (e.g., a family portrait or a book/magazine). According to one or more embodiments, the environment can include objects having reflective surfaces that reflect visible content from another object into the images/video captured within the field of view by image capturing device 230. As an example, a personal (or on-person) objects, such as a pair of eyeglasses) can be attached to the participant 223A and may reflect second content presented on a different surface. The reflected second content is then present within the captured video stream from the field of view. As another example, a mirror can be installed on a wall at a location within the field of view and may reflect content from another surface that may or may not be within the field of view (e.g., content from object 246). Some objects (e.g., a mirror) within a field of view may be in a fixed position, while some objects (e.g., a projector screen) may be movable. The objects in the field of view may be partially or wholly blocked when the participant 223 is present within the field of view. Each of the objects 240, 242 and 244 may be associated with a content visible on the surface. The content may be static (e.g., a family portrait), and the content may be dynamic (e.g., a movie presented on a display of a television). During a video communication session that does not utilize/implement the features of the present disclosure, it is possible that the secondary content presented on a surface of the objects captured by the image capturing device 230 may be included in image streams transmitted to and viewable by the other participants 223B-223D in the video communication session. The image streams may include secondary content that the participant 223A is directly or indirectly consuming but which the participant 232A may prefer to keep private from or to not disclose to the other participants 223B-223D. The participant 232A may be unaware that the secondary content is being transmitted within the image stream.

Figures 3A, 3B, 3C, 3D:
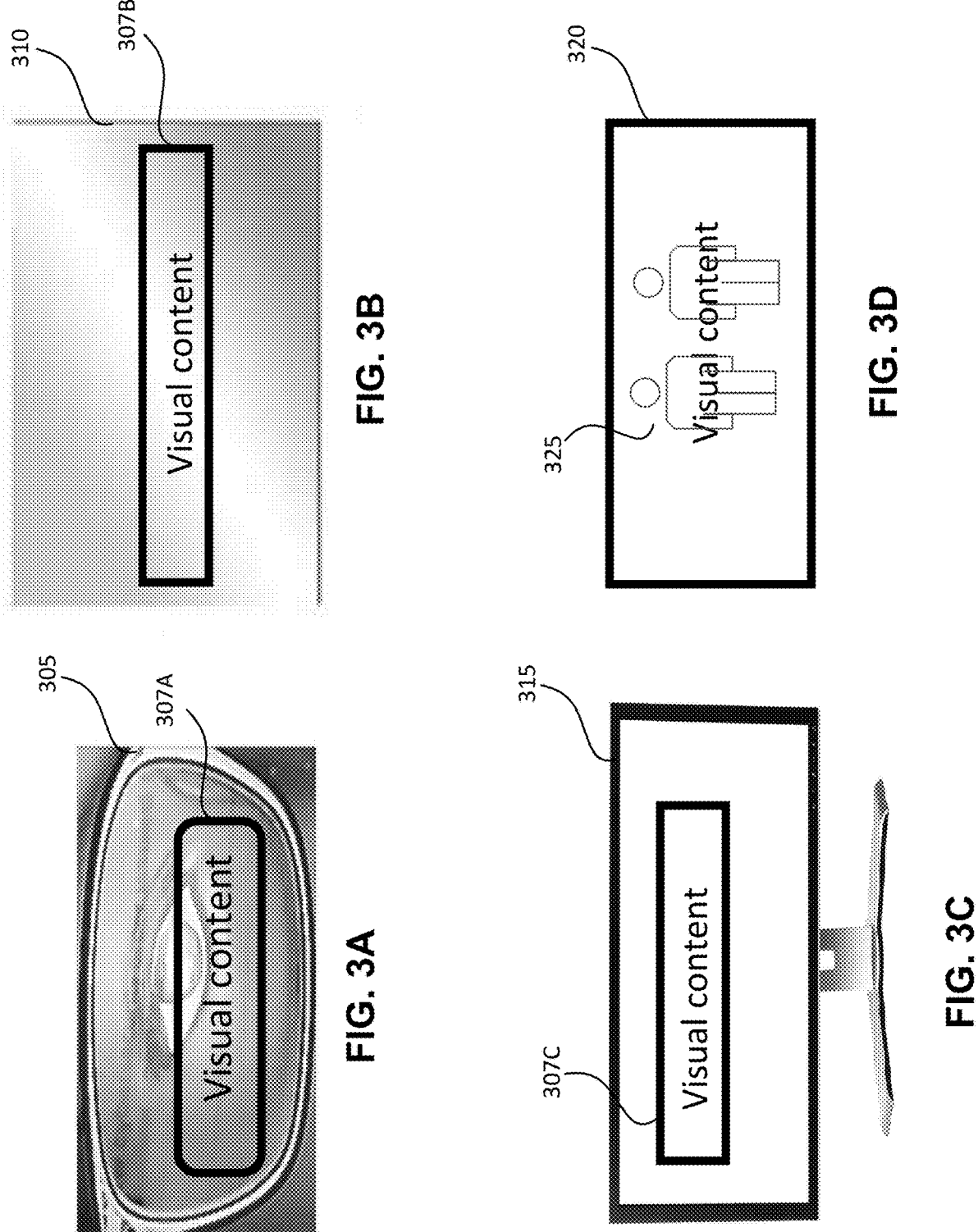
FIGS. 3A-3D depict examples of secondary content (i.e., secondary visual content) being presented on different surfaces that are positioned within a field of view of an image capturing device, according to one or more embodiments.

FIGS. 3A-3D depict examples of secondary content (i.e., secondary visual content) being presented on different surfaces that are positioned within a field of view of an image capturing device, according to one or more embodiments. Objects (305, and 310) depicted in FIGS. 3A-3B are non-electronic objects that each have a reflective surface. For example, object 305 of FIG. 3A is a non-electronic pair of eyeglasses that has a reflective surface on the exterior facing side of the eyeglasses. While a participant wearing the eye glasses is viewing content from a different source than the video communication session, visual content 307A is reflected off of the reflective surface of the eye glasses. The visual content 307A presented on the reflective surface of the object 305 may originate from a different object, but the visual content is captured within the image stream and may thus be visible to other participants in a video communication session. As a more specific example, referring to FIG. 2, the participant 223A may be wearing glasses and looking at a confidential document open on the display device 233. A portion of the confidential document presented on the display device 233 may be reflected on the surface of the eyeglasses (object 305) and may be visible to the other participants 223B-223D in the video communication session.

FIG. 3B depicts a mirror as another non-electronic object 310 with a reflective surface and presenting visual content 307B originated from a different object. In an example embodiment, the mirror can be located behind the participant 233A at a location that allows a reflection of the confidential document or other content open on the display device 233 to be captured and shared within the image stream.

In one or more embodiments, as illustrated by FIG. 3C, the object is an electronic object, and the object's visible surface may be a display device. The object may be the source of the content that is being presented on its surface. For example, the object may be a laptop that is executing a local application that presents the content. Alternatively, the object may be presenting content that is received from a second source, such as the Internet or another electronic device. For example, the object 315 may be a television and the object's surface is the television screen that may be presenting content of a news program or other program. During the video communication session, at least a portion of the content of the news program may be visible to the other participants 223B-223D since the object 315 is within the field of view of the image capturing device 230. In one or more embodiments, an electronic object (such as a television) may have a reflective surface, and the reflective surface may reflect content that originates from another electronic or non-electronic object. For example, since the surface of the object 315 is reflective, the content being presented on the surface can originate from a different source, such as the display device 233 (FIG. 2). In one or more embodiments, as illustrated by FIG. 3D, the object is a non-electronic object and has a non-reflective surface. For example, the object 320 depicted in FIG. 3D may be a family portrait showing different members of a family, which the participant 223A may prefer to keep private.

In one or more embodiments, the communication device 200 (depicted in FIG. 2) may be configured to identify surfaces within a field of view and to perform operations to obfuscate, remove, or otherwise prevent from being visibly transmitted, at least a portion of the secondary content presented on at least a portion of the identified surfaces. In one or more embodiments, the operations to obfuscate, remove, or prevent the secondary content from being visibly transmitted may include video fragmentation, which partitions the video frames into smaller fragments.

Figure 4A:
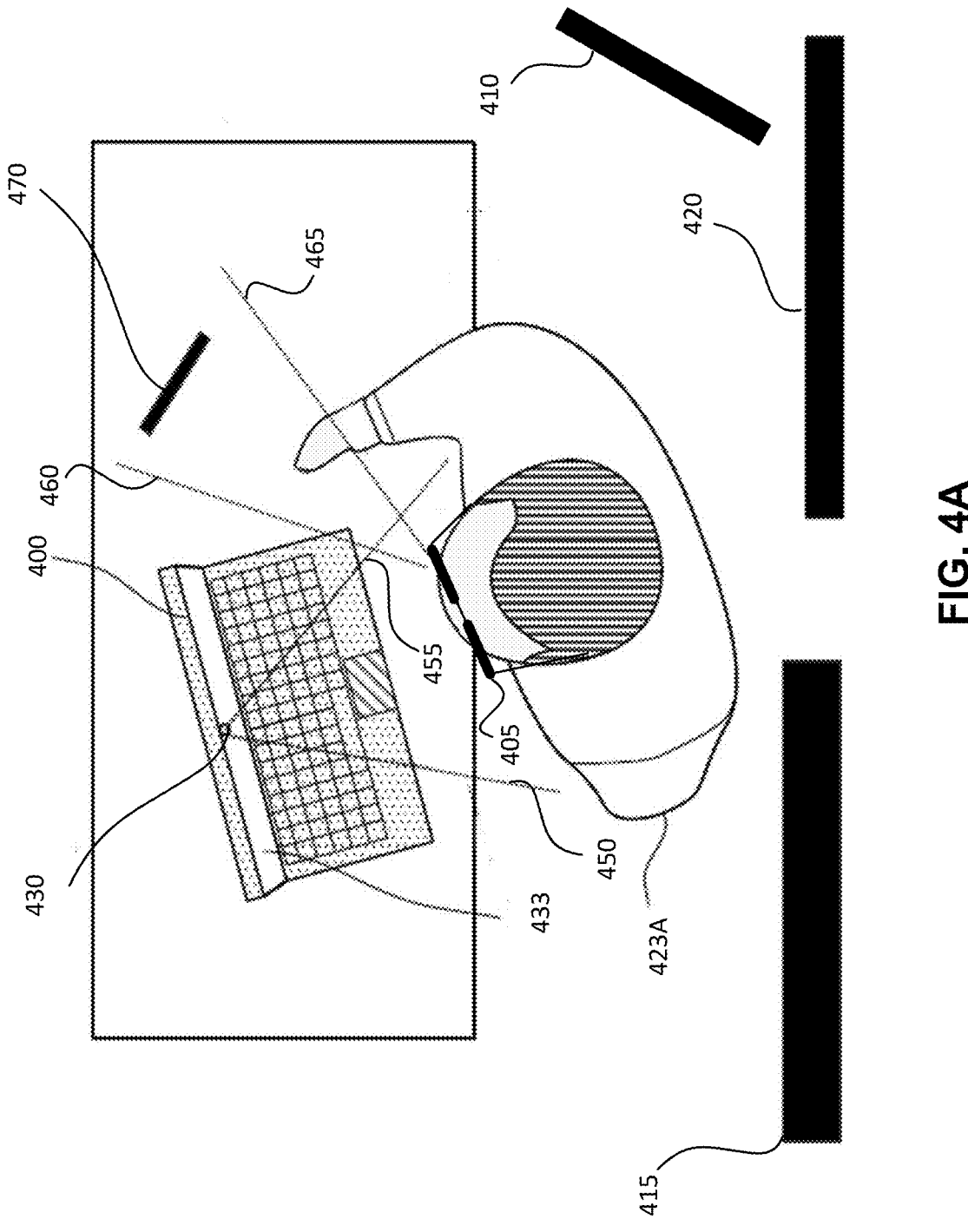
FIGS. 4A-4C depict atop view of a participant using a communication device to participate in a video communication session in an environment with various objects having surfaces that can present secondary content, according to one or more embodiments.
Figure 4B:
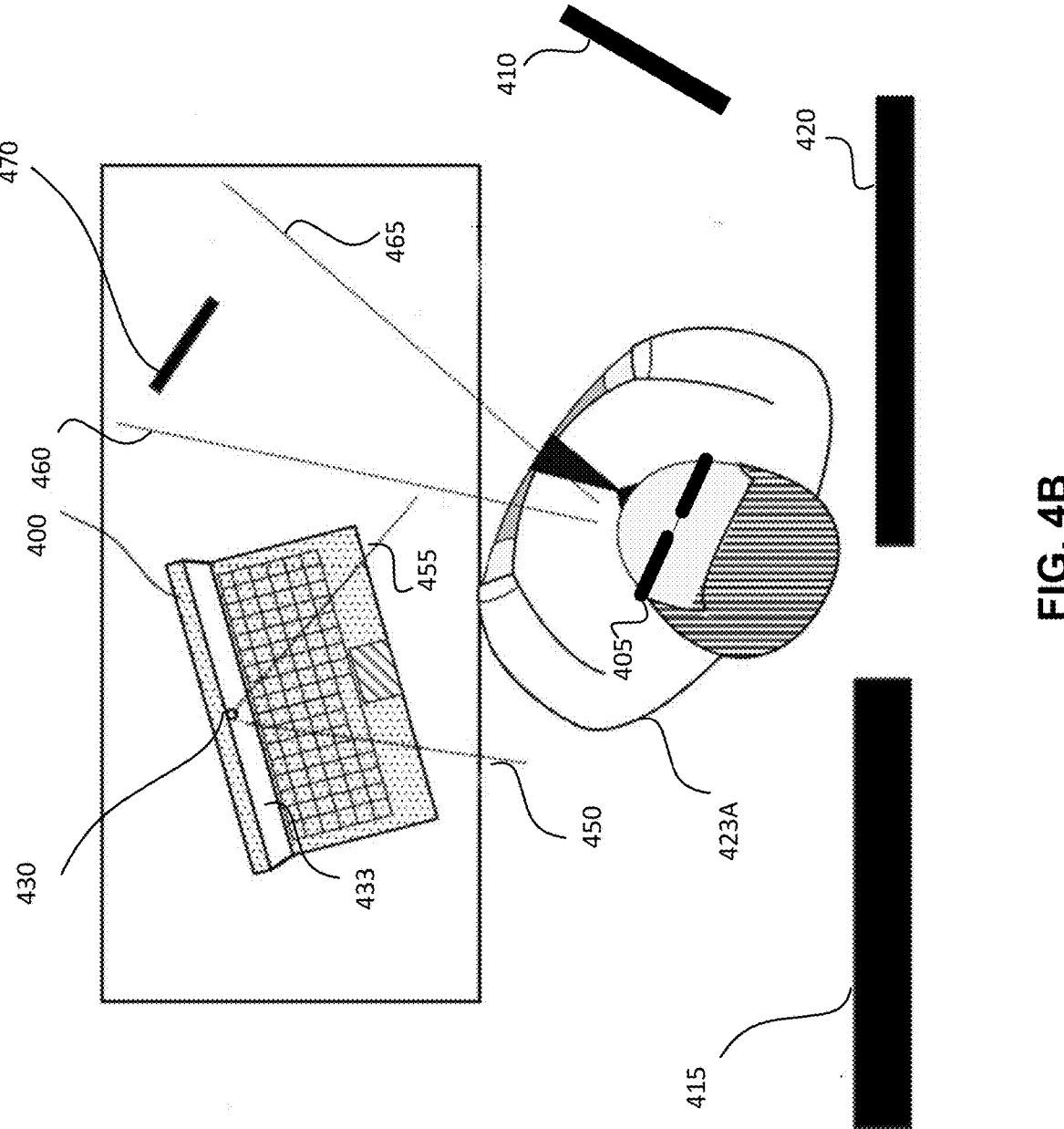
Figure 4C:
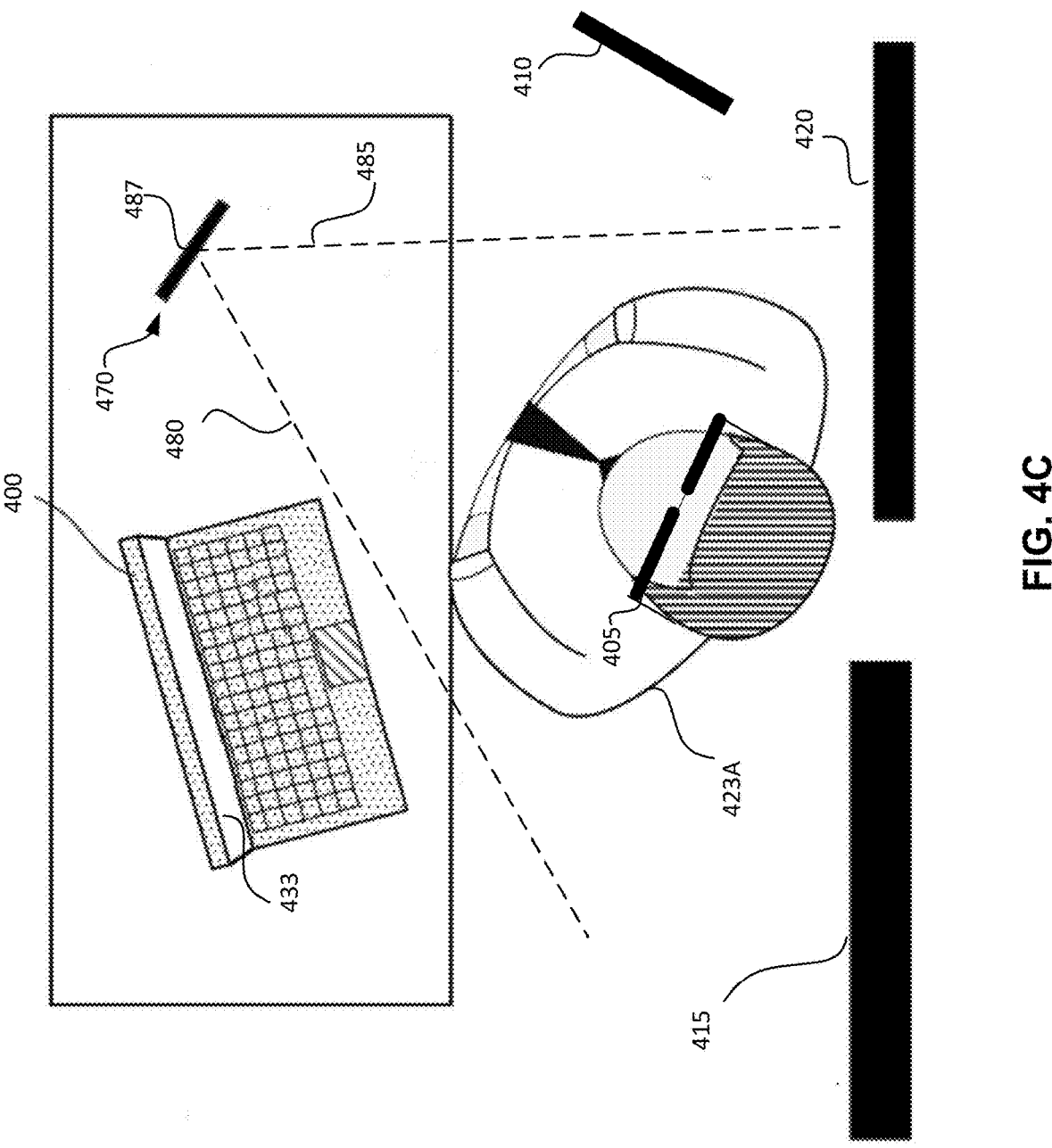

FIGS. 4A-4C depict atop view of a participant using a communication device to participate in a video communication session in an environment with various objects having surfaces that can present secondary content, according to one or more embodiments. Participant 423A is depicted in FIG. 4A positioned in front of a communication device 400, which is shown as a laptop computer system. The participant 423A is also shown wearing a pair of glasses (which is object 405). The communication device 400 includes an image capturing device 430 and a display device 433. The image capturing device 430 may be associated with a first field of view that includes a three-dimensional area between a left boundary line 450 and a right boundary line 455, shown in two-dimension. Objects 410-420 are positioned in proximity to the participant 423A and may be a combination of electronic and non-electronic objects. In line with the examples of FIGS. 3A-3D, object 405 is a pair of eyeglasses being worn by participant 423A, object 410 is a mirror or reflective surface behind participant 423A, object 415 is an electronic object, such as a television, presenting secondary content, and object 420 is another non-electronic object, such as a picture or piece of art. In one or more embodiments, the image capturing device 430 may capture at least a portion of information (e.g., images, text, data, and/or videos) that are presented on the surfaces of one or more of the objects 405-420.

In one or more embodiments, the communication device 400 may be locally communicatively connected with another device 470 (referred to as connected device) via a wired or wireless network interface and communication protocol such as, for example, via Bluetooth. For example, the connected device 470 may be a smart phone or a tablet. In one or more embodiments, while participating in a video communication session, the participant 423A may multi-task and glance at the connected device 470 (depicted in FIG. 4B). From a perspective of the participant 423A, the glancing at the connected device 470 may be associated with a second field of view that includes a three-dimensional area between a left boundary line 460 and a right boundary line 465, shown in two-dimension. Within the second field of view, the participant 423A may be able to view content being presented by the connected device 470 on the display device of the connected electronic device 470, as well as content of any objects that may be positioned within the second field of view. In one or more embodiments, content being presented on the display device of the connected device 470 may be reflected on a surface of one or more of the objects 410, 415, and 420 and may be captured by the image capturing device 430. Similarly, the content presented on the display of the connected device 470 may also be reflected on the surface of the eyeglasses 405.

FIG. 4C depicts using an image capturing device 487 of a connected device 470 instead of the image capturing device 430 (FIG. 4B) of the communication device 400 to participate in a video communication session, in one or more embodiments. Referring to FIG. 4C, the participant 423A may be positioned with the field of view of the image capturing device 487 which includes a three-dimensional area between a left boundary line 480 and a right boundary line 485, shown in two-dimension. Using the image capturing device 487 instead of the image capturing device 430 (FIG. 4B) can be advantageous because the image capturing device 487 may have better resolution than the image capturing device 430, among other advantages. Similar to the environment described with FIG. 4B, the image capturing device 487 can capture secondary content presented on the display device 433 when the secondary content is reflected by one or more of the surfaces of the objects 405, 410, 415 and 420.

Figure 5:
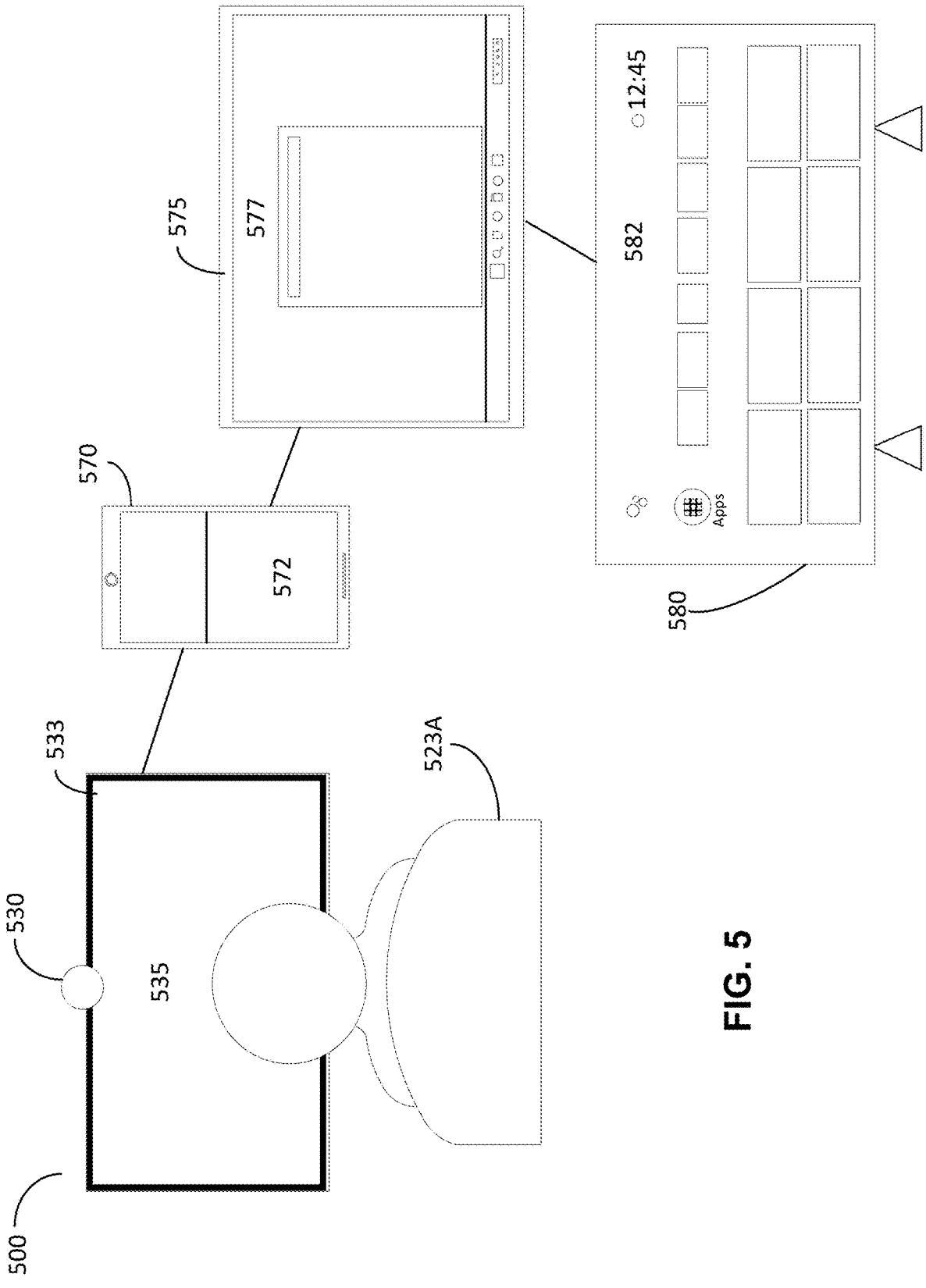
FIG. 5 depicts an example environment in which second connected devices may be connected to a communication device used by a participant of a video communication session, according to one or more embodiments.

FIG. 5 depicts an example environment in which connected devices may be connected to a communication device used by a participant of a video communication session, according to one or more embodiments. The connected devices include first connected device 570 (e.g., a smart phone), second connected device 575 (e.g., a tablet) and third connected device 580 (e.g., a smart television). Participant 523A is depicted in FIG. 5 as being positioned in front of display device 533 and image capturing device 530 associated with a communication device 500. In one or more embodiments, NIC 185 (depicted in FIG. 1A) may be used to enable communication between the communication device 500 and the connected devices 570, 575, and 580. Other connection methods can be utilized in alternate embodiments. It may be noted that although the connected devices 570, 575 and 580 are depicted to be adjacent to one another, the different connected devices 570, 575 and 580 are not limited to any particular connection location or sequence or connection and can be positioned anywhere in proximity to the participant 523A. In one or more embodiments, each of the connected devices 570, 575 and 580 may be in communication directly with the communication device associated with the display 535 using a communication interface such as, for example, the wireless communication channel(s) 172f (FIG. 1A) In one or more embodiments, one or more of the connected devices 570, 575 and 580 may communicate with the communication device 500 via another connected device. As discussed above, it may be possible that the content 575, 577, 582 presented on a display device of one of the connected devices 570, 575, and 580 be reflected to one of the surfaces of the objects 405, 415 and 420 (depicted in FIGS. 4A-4B) and be captured by the image capturing device 430 as secondary content.

Figure 6A:
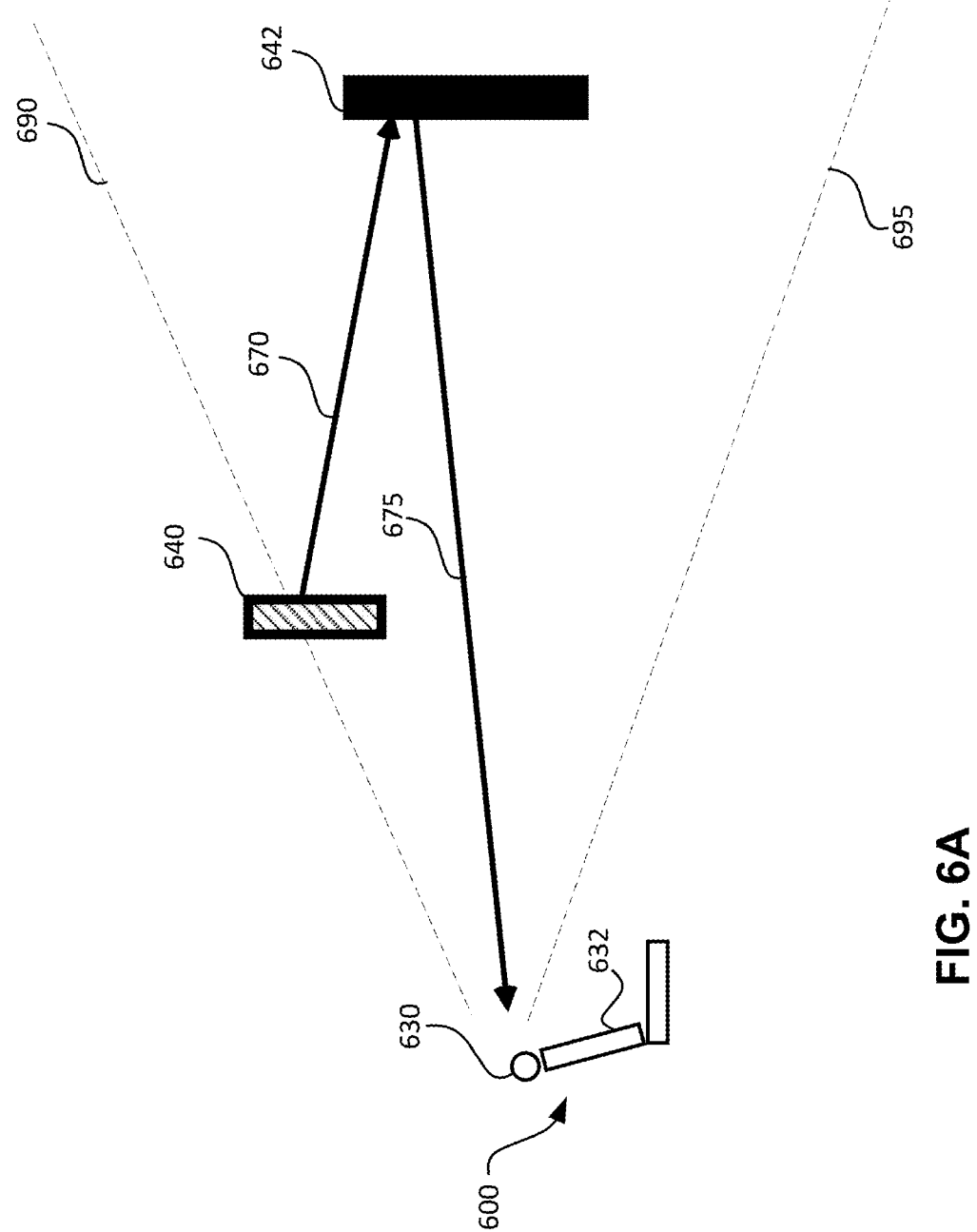
FIGS. 6A and 6B depict side views of example environments that include image capturing device and a reflective surface to illustrate reflection of a secondary content that may be visible to participants in a video communication session, according to one or more embodiments.
Figure 6B:
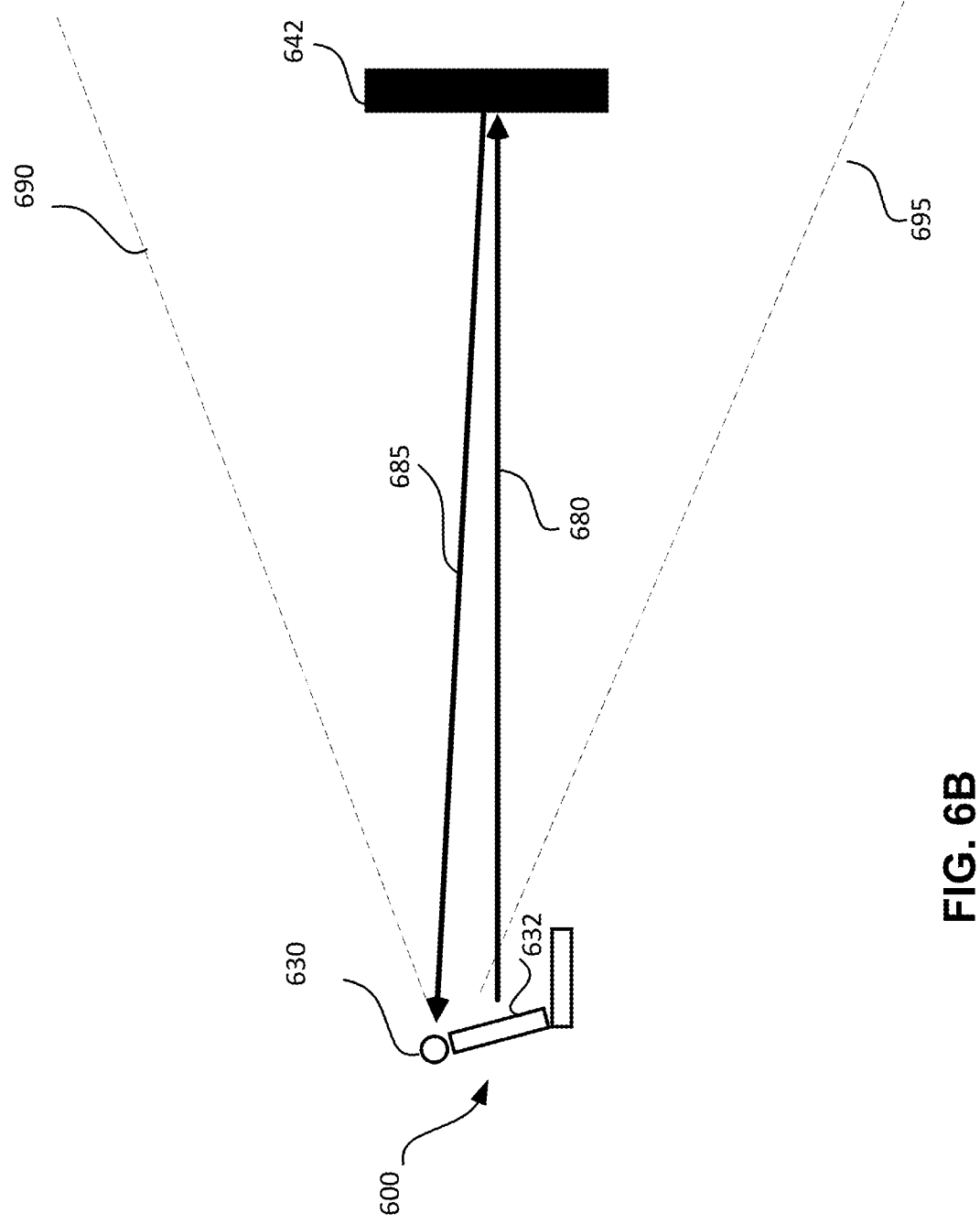

FIGS. 6A and 6B depict side views of example environments that include image capturing device and a reflective surface to illustrate reflection of a secondary content that may be visible to participants in a video communication session, according to one or more embodiments. Communication device 600 is depicted in FIGS. 6A and 6B as a laptop computer system with a foldable display 632. The communication device 600 may be associated with image capturing device 630 which may or may not be integrated into the communication device 600. Connected device 640 is depicted in FIG. 6A to present content (also referred to as secondary content) on its display. The secondary content may then be mirrored onto the surface of the object 642 through path 670 such that at least a portion of the secondary content is visible on the surface of the object 642. The visual content on the surface of the object 642 may then be captured by the image capturing device 630 within the field of view defined by hyphenated lines 690 and 695 via reflective path 675. Similarly, referring to FIG. 6B, the secondary content presented on the display 632 may be mirrored onto the surface of the object 642 through path 680 such that at least a portion of the secondary content presented on the display 632 is visible on the surface of the object 642 and is captured as visual image by the image capturing device 630 via reflective path 685. It may be noted that, in other implementations, the display 632 presenting the original content can be positioned at a location that is a distance away from the image capturing device 630, such as where the image capturing device 630 is a stand-alone component or is integrated into a second device, such as a smart phone connected via a dock to the display 632. Although FIGS. 6A and 6B depict only one object 642, it is possible that there may be multiple objects, and the secondary content presented on the display 632 may be mirrored by an object other than the object 642. For example, the secondary content presented on the display 632 may be mirrored by the eyeglasses 405 (shown in FIG. 4A) worn by the participant 423A.

In one or more embodiments, the secondary content presented on the display of the connected device 640 is communicated to the communication device 600 associated with the image capturing device 630. For example, this may be accomplished by executing an application that shares the content presented on the display of the connected device 640 to the communication device. In one or more embodiments, the communication device 600 may be configured to compare the secondary content being presented by the connected device 640 with the visual content captured by the image capturing device 630. When the communication device 600 determines that at least a portion of the secondary content is similar to the visual content, operations may be performed to cause at least a portion of the visual content to be obfuscated and not be presented to or visible by other participants in the video communication session. In one or more embodiments, the operations to determine similarities between the secondary content and the visual content may include video fragmentation, which partitions videos into sets of frames based on certain characteristics or defined criteria.

Figure 8:
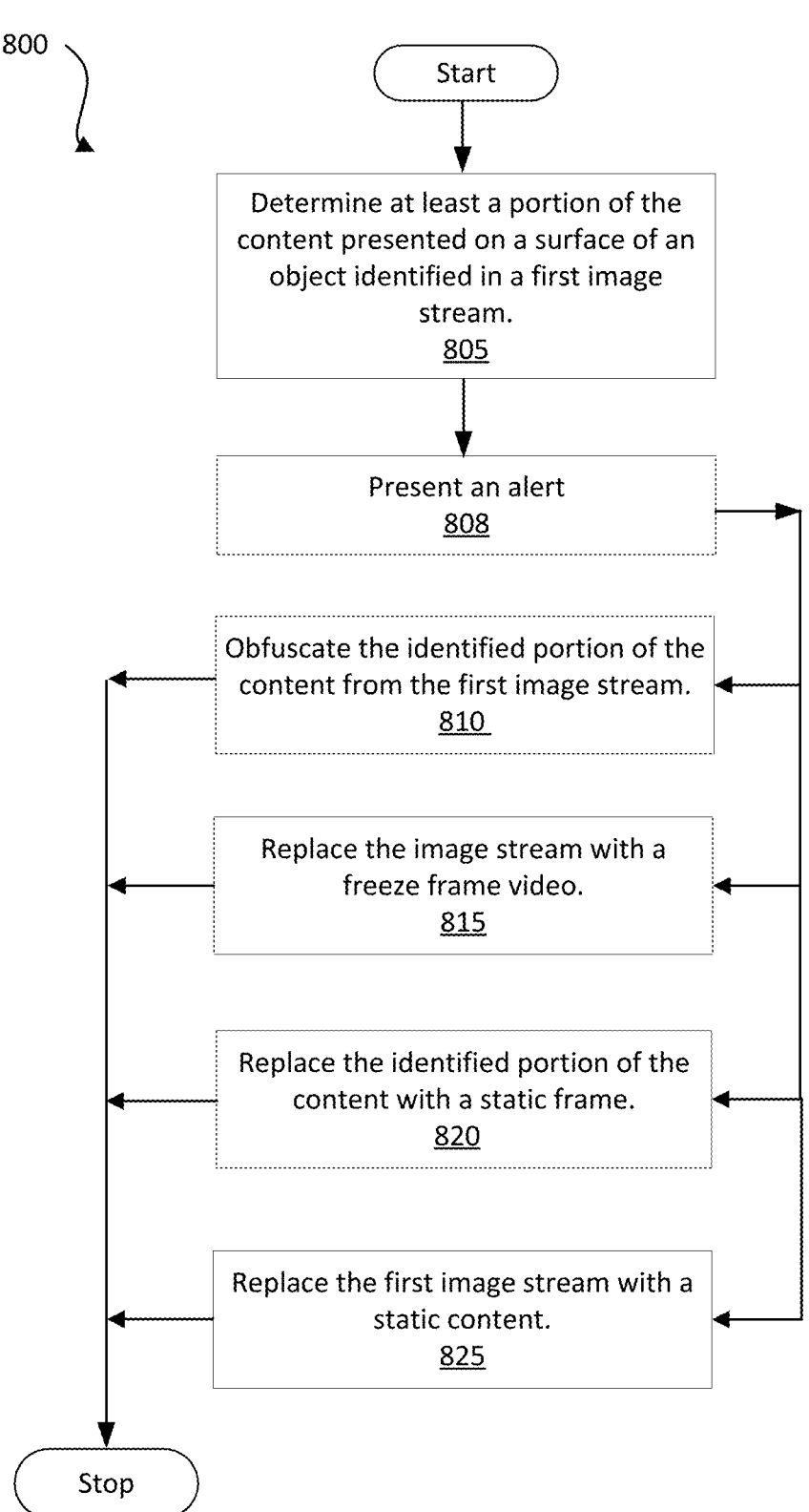
Figure 9:
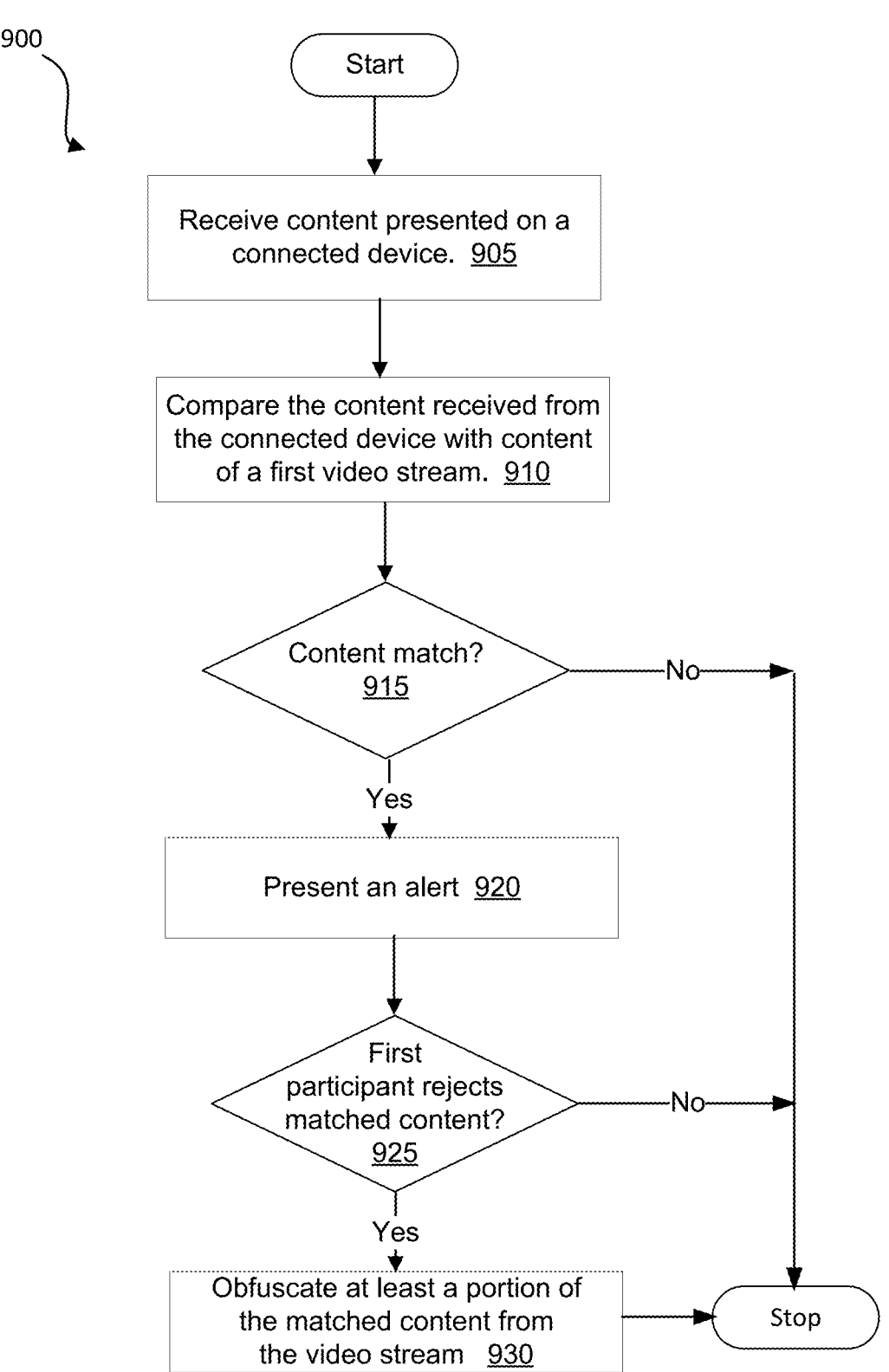

FIGS. 7-9 depict flow diagrams of three different methods for preventing displaying of secondary content that are presented on visible surfaces included within an image stream being captured for transmission via a video communication session to second participant devices, according to one or more embodiments. In at least one embodiment, communication device 100, managed by controller 110, executes video conference application 114, configuring communication device 100 (FIG. 1) to facilitate a video communication session that includes functionality described for method 700 as well method 800 (FIG. 8) and method 900 (FIG. 9). The description of methods 700/800/900 is provided with general reference to the specific components illustrated within the preceding FIGS. 1-6, and specific components referenced in methods 700/800 may be identical or similar to components of the same name used in describing preceding FIGS. 1-6.

With reference to FIG. 7, method 700 may be applied for a video communication session with an image capturing device activated such that a video stream would include at least an image of the first participant and an area proximate to the first participant. The method may include generating a first image stream from content captured by an image capturing device of at least one image capturing device (block 705). The image capturing device is configured to be associated with a display device. The image capturing device has a field of view that incorporates a first participant of a video communication session. Method 700 may include identifying content presented on surfaces of objects positioned within the field of view of the image capturing device (block 710). The objects may be electronic or non-electronic and may be positioned in a proximity of the first participant. For example, the content may include content presented on a surface of a television, on a mirror, or a painting. The identification of the content presented on a surface of an electronic or non-electronic object may be performed using video segmentation.

In one or more embodiments, method 700 may include generating a second image stream that does not include at least a portion of the content presented on surfaces of objects identified in the first image stream (block 715). The generation of the second image stream may include obfuscating (or preventing) at least a portion of the content from being viewable by the at least one second participant in the video communication session.

In one or more embodiments, method 700 may optionally include generating and presenting/displaying an alert such as, for example, a pop-up window, so that the first participant in the video communication session is aware of the presence of the content on a surface of an object before the second image stream is transmitted to the at least one second participant (block 712). Method 700 is shown with features of block 712 following blocks 710; however, it is appreciated that the features of block 712 can, in the alternative, be completed after block 715. In one or more embodiments, method 700 may include transmitting the second image stream to the at least one second participant in the video communication session (block 720). The transmission of the second image stream may be performed in place of transmitting the first image stream to the at least one second participant.

With reference to FIG. 8, method 800 may expand the operations described in block 710 of FIG. 7. Method 800 may include determining that at least a portion of the first image stream includes content presented on a surface of an object captured in the first image stream (block 805). For example, there may be multiple objects with surfaces identified in the first image stream, and each surface may include multiple portions of content. Based on having determined that the at least one portion of the content is to be prevented from being transmitted to or viewable by at least one second participant in the video communication session, method 800 may continue to block 808 where an alert may be presented. The alert may be used to notify the first participant that the second participant in the video communication session may be able to view the visual content on one or more surfaces within the field of view of the image capturing device 630 (depicted in FIGS. 6A and 6B). The alert may be presented within the display 535 (depicted in FIG. 5). For example, the alert may include information to enable the first participant to decide whether to proceed with preventing the at least one portion of the visual content from being viewable. In one or more embodiments, the first participant may ignore the alert and may continue with the video communication session allowing the visual content shown on one or more surfaces to be viewable by the second participant. Alternatively, the first participant may prefer to prevent the second participant from being able to view the visual content on the one or more surfaces. In this latter scenario, the method 800 may continue with one or more techniques to prevent the at least one portion of the visual content from being viewable.

From block 808, the method 800 can include obfuscating the at least one portion of the content (block 810). This may include, for example, overlaying the at least one portion of the content with a solid color block. Alternatively, from block 808, the method 800 may include replacing the image stream with an earlier-recorded freeze frame video (block 815). This may include, for example, using a previously recorded video segment of the participant within the video conference, where the previously recorded video segment does not include the secondary content within the image stream. In one or more embodiments, the previously recorded video segment can be looped and presented as the image stream until the original image stream being captured in real time no longer presents/includes the secondary content.

From block 808, the method 800 may include replacing the at least one portion of the content with a static frame/image (block 820). This may include, for example, integrating within a portion of the image stream an existing frame that includes a different rendition of the portion of the content that does not include the secondary content. The image stream presents the live view of the first participant, with the one or more frames from the first image stream replaced to prevent the at least one portion of the visual content from being visible. From block 808, the method 800 may include replacing the first image stream with a static content (block 825). This may include, for example, replacing the first image stream with a static scenic image or picture to override the entire content of the image stream.

In one or more alternate embodiments, the features described herein can be implemented at the server of FIG. 1B that is supporting the video conferencing session, instead of being performed locally at the individual communication device at which the image stream originates (i.e., is generated). With these embodiments, the image stream captured at the communication device is transmitted from the communication device to the server. The server then utilizes an AI engine 198 to parse through the image stream content and to detect/determine the presence of the secondary content within the image stream. One or more of the supported features from method 800 are then performed by the server on the image stream to generate a second image stream (e.g., a modified version of the first image stream or a new image stream altogether). The second image stream is then forwarded to the other second communication devices connected to the video communication session.

FIG. 9 depicts a flow diagram of method 900 for detecting matched content with content received from a connected device and performing operations based on feedback received from a first participant, in accordance with one or more embodiments. With reference to FIG. 9, method 900 may be applicable in an environment where the communication device is communicatively connected with one or more connected devices, as depicted in FIG. 5 and associated description. Method 900 may include receiving a copy of content being presented (e.g., via a screengrab) within a display screen of a connected device. The receiving of the copy of the content may be via a network interface (e.g., NIC 185 depicted in FIG. 1A) of the communication device (block 905). At block 910, one or more operations may be performed (e.g., by the AI engine 198) to compare the content received from the connected device with secondary content within a first video stream generated to present content captured by the image capturing device 530 (depicted in FIG. 5).

At block 915, one or more operations may be performed to determine whether the copy of the content received from the connected device matches with any (secondary) content included in the first video stream. When there is no match, the method 900 may end. Alternatively, when there is a match, the method 900 may continue to block 920 where an alert may be generated. As described with FIGS. 4A and 4B, the secondary content presented by the connected device may be reflected as visual content on a reflective surface proximate to the first participant. The alert may notify the first participant that at least a portion of the secondary content presented on a connected device can be visible to other participants in the video communication session. The first participant may then have an option to reject or to accept allowing the secondary content to be visible to the other participants.

At block 925, one or more operations may be performed to process the decision by the first participant. When the first participant decides to allow the other participants to view the visual content, the method 900 ends. Alternatively, when the first participant decides to prevent the other participants from viewing the visual content, the method 900 may continue to block 930 where one or more operations may be performed to obfuscate, remove, or replace one or more portions of the visual content from the first video stream, as described in method 800 of FIG. 8.

In one or more embodiments, one or more of methods 700/800/900 further include having (i) the secondary content comprising visual content presented on one or more of a display of the communication device, a secondary electronic content source, and a non-electronic content source, (ii) at least one surface being a reflective surface, and (iii) the secondary content being reflected by the reflective surface and capture within the first image stream. One or more of methods 700/800/900 further include having a first communication device communicatively connects to at least one second electronic device during a video communication session. The secondary content includes visual content presented on a second display associated with the at least one second electronic device. One or more of the method 700/800/900 includes, in response to detecting a presence of the secondary content within a first image stream: (i) accessing a feed of the visual content being presented on the second display associated with the at least one second electronic device, (ii) comparing the secondary content to the visual content being presented on the second display to determine whether the visual content presented on the second display matches the secondary content, and (iii) triggering the generation of the second image stream in response to the secondary content matching at least a portion of the visual content presented on the second display.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device, or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. A communication device comprising:
a first display device;
at least one image capturing device, including a first image capturing device having a first field of view that incorporates a space in front of the first image capturing device, the first image capturing device producing a first image stream encompassing content within the first field of view;
at least one network interface, including a first network interface that communicatively connects the communication device via a first network to at least one second communication device during a video communication session; and
a controller communicatively coupled to the first display device, the first image capturing device, and the first network interface, and which:
identifies, within the first image stream, at least one surface having secondary content displayed thereon that is visible and included in the first field of view, the at least one surface not being a body of the participant; and
in response to identifying the secondary content displayed within the at least one surface:
generates a second image stream that does not include at least a portion of the secondary content; and
transmits the second image stream in place of the first image stream to the at least one second communication device during the video communication session.

2. The communication device of claim 1, wherein:
the at least one surface is a reflective surface;
the secondary content comprises visual content presented on one or more of a display of the communication device, a secondary electronic content source, and a non-electronic content source; and the secondary content is being reflected by the reflective surface and captured within the first image stream.

3. The communication device of claim 1, wherein to generate the second image stream, the controller:
obfuscates the portion of the secondary content from the at least one surface included in the first field of view.

4. The communication device of claim 1, wherein to generate the second image stream, the controller:
replaces at least a portion of the first image stream with a freeze frame video presenting an earlier-recorded image stream that does not include the secondary content.

5. The communication device of claim 1, wherein to generate the second image stream, the controller:
replaces at least the portion of the secondary content with a static content.

6. The communication device of claim 5, wherein to generate the second image stream, the controller:
replaces all of the first image stream with the static content.

7. The communication device of claim 1, further comprising:
a second network interface that communicatively connects the communication device to at least one second electronic device during the video communication session, wherein the secondary content comprises visual content presented on a second display associated with the at least one second electronic device.

8. The communication device of claim 7, wherein the controller is communicatively coupled to the second network interface, and wherein to identify the secondary content, the controller:
in response to detecting a presence of the secondary content within the first image stream, accesses a feed of the visual content being presented on the second display associated with the at least one second electronic device;
compares the secondary content to the visual content being presented on the second display to determine whether the visual content presented on the second display matches the secondary content; and
triggers the generation of the second image stream in response to the secondary content matching at least a portion of the visual content presented on the second display.

9. A method comprising:
capturing, by a first image capturing device, a first image stream encompassing content within a first field of view, the first image capturing device associated with a first communication device participating in a video communication session via a first network;
identifying, within the first image stream, sat least one surface having secondary content displayed thereon that is visible and included in the first field of view, the at least one surface not being a body of the participant; and
in response to identifying the secondary content displayed within the at least one surface:
generating a second image stream that does not include at least a portion of the secondary content; and
transmitting the second image stream in place of the first image stream to the at least one second communication device during the video communication session.

10. The method of claim 9, wherein:

the at least one surface is a reflective surface;

the secondary content comprises content presented on one or more of a display of the communication device, a secondary electronic content source, and a non-electronic content source; and the secondary content is being reflected by the reflective surface and captured within the first image stream.

11. The method of claim 9, wherein generating the second image stream comprises:

obfuscating the at least a portion of the secondary content from the at least one surface included in the field of view.

12. The method of claim 9, wherein generating the second image stream comprises:

replacing at least a portion of the first image stream with a freeze frame video presenting an earlier-recorded image stream that does not include the secondary content.

13. The method of claim 9, wherein generating the second image stream comprises:

replacing at least the portion of the secondary content with a static content.

14. The method of claim 9, wherein the secondary content comprises content presented on a display associated with the first communication device.

15. The method of claim 9, wherein the first communication device communicatively connects to at least one second electronic device during the video communication session, wherein the secondary content comprises visual content presented on a second display associated with the at least one second electronic device.

16. The method of claim 15, wherein in response to detecting a presence of the secondary content within the first image stream:

accessing a feed of the visual content being presented on the second display associated with the at least one second electronic device;

comparing the secondary content to the visual content being presented on the second display to determine whether the visual content presented on the second display matches the secondary content; and triggering the generation of the second image stream in response to the secondary content matching at least a portion of the visual content presented on the second display.

17. The method of claim 16, further comprising:

generating and outputting an alert in response to identifying a presence of the secondary content.

18. A computer program product comprising:

a non-transitory computer readable storage device; and program code on the computer readable storage device that when executed by a processor associated with a communication device, the program code enables the communication device to provide functionality of:

capturing, by a first image capturing device, a first image stream encompassing content within a first field of view, the first image capturing device associated with a first communication device participating in a video communication session via a first network;

identifying, within the first image stream, at least one surface having secondary content displayed thereon that is visible and included in the first field of view, the at least one surface not being a body of the participant; and in response to identifying the secondary content displayed within the at least one surface:

generating a second image stream that does not include at least a portion of the secondary content; and transmitting the second image stream in place of the first image stream to the at least one second communication device during the video communication session.

19. The computer program product of claim 18, wherein:

the at least one surface is a reflective surface;

the secondary content comprises visual content presented on one or more of a display of the communication device, a secondary electronic content source, and a non-electronic content source; and the secondary content is being reflected by the reflective surface and captured within the first image stream.

20. The computer program product of claim 18, wherein the program code enables the communication device to provide the functionality of generating the second image stream comprises one or more of: (i) obfuscating the at least a portion of the secondary content from the at least one reflective surface included in the field of view, (ii) replacing at least a portion of the first image stream with a freeze frame video presenting an earlier-recorded image stream that does not include the secondary content, (iii) replacing the at least a portion of the secondary content with a static content, and (iv) replacing the first image stream with a static content.

* * * * *